(12) United States Patent
Johannes et al.

(10) Patent No.: US 11,216,071 B2
(45) Date of Patent: Jan. 4, 2022

(54) LOW-PROFILE TACTILE OUTPUT APPARATUS AND METHOD

(71) Applicant: The Johns Hopkins University, Baltimore, MD (US)

(72) Inventors: Matthew S. Johannes, Arvada, CO (US); Jared M. Wormley, Washington, DC (US); Matthew S. Fifer, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 16/722,674

(22) Filed: Dec. 20, 2019

(65) Prior Publication Data

US 2020/0209974 A1  Jul. 2, 2020

Related U.S. Application Data

(60) Provisional application No. 62/787,479, filed on Jan. 2, 2019.

(51) Int. Cl.
*G06F 3/041* (2006.01)
*G06F 3/045* (2006.01)
*G06F 3/01* (2006.01)
*H01F 7/08* (2006.01)

(52) U.S. Cl.
CPC .............. *G06F 3/016* (2013.01); *H01F 7/08* (2013.01)

(58) Field of Classification Search
CPC ..................... G02B 2027/0178; G02B 27/017
See application file for complete search history.

(56) References Cited

U.S. PATENT DOCUMENTS

| | | |
|---|---|---|
| 5,697,493 A | 12/1997 | Sach et al. |
| 6,072,475 A | 6/2000 | van Ketwich |
| 6,432,112 B2 | 8/2002 | Brock et al. |
| 7,106,313 B2 | 9/2006 | Schena et al. |
| 7,191,191 B2 | 3/2007 | Peurach et al. |
| 7,218,310 B2 | 5/2007 | Tierling et al. |
| 7,450,110 B2 | 11/2008 | Shahoian et al. |
| 7,499,021 B2 | 3/2009 | Bailey |
| 7,636,080 B2 | 12/2009 | Rosenberg et al. |
| 8,059,104 B2 | 11/2011 | Shahoian et al. |
| 8,427,433 B2 | 4/2013 | Edwards et al. |

(Continued)

FOREIGN PATENT DOCUMENTS

WO    2002073587    9/2002

*Primary Examiner* — Nan-Ying Yang
(74) *Attorney, Agent, or Firm* — Todd R. Farnsworth

(57) ABSTRACT

A tactile output apparatus is provided that includes a dermal contact surface. The apparatus also includes a first securing member and a second securing member. A first arm may be pivotally coupled to the first securing member, and a second arm may be pivotally coupled to the second securing member. The first arm may also be pivotally coupled to the second arm at an arm pivot point, and the dermal contact surface may move with the arm pivot point. The first securing member may be movable along a first securing member travel path towards or away from the second securing member and movement of the first securing member along the first securing member travel path may cause responsive movement of the arm pivot point and the dermal contact surface in a direction having a movement component perpendicular to the first securing member travel path.

16 Claims, 12 Drawing Sheets

(56) References Cited

U.S. PATENT DOCUMENTS

| | | |
|---|---|---|
| 9,524,030 B2 | 12/2016 | Modarres et al. |
| 2001/0020140 A1 | 9/2001 | Kramer |
| 2007/0138886 A1* | 6/2007 | Krebs .................... F16H 37/14 310/112 |
| 2009/0139359 A1* | 6/2009 | Wagner ................ G09B 21/004 74/469 |
| 2009/0201248 A1 | 8/2009 | Negulescu et al. |
| 2012/0206248 A1 | 8/2012 | Biggs |
| 2015/0154885 A1* | 6/2015 | Livermore-Clifford .................... G09B 21/003 434/114 |
| 2015/0277506 A1 | 10/2015 | Cheah et al. |
| 2016/0209926 A1* | 7/2016 | Hashimoto ......... G06F 3/04886 |
| 2016/0358428 A1* | 12/2016 | Provancher ............. G06F 3/011 |
| 2017/0153703 A1* | 6/2017 | Yun .................... G06F 3/03547 |

* cited by examiner

LOW-PROFILE TACTILE OUTPUT APPARATUS AND METHOD

CROSS-REFERENCE TO RELATED APPLICATIONS

This application claims the benefit of U.S. Provisional Application No. 62/787,479 filed on Jan. 2, 2019, the entire contents of which are hereby incorporated herein by reference.

TECHNICAL FIELD

Example embodiments generally relate to user interface technologies and, in particular, relate to the tactile or haptic output and feedback apparatuses and methods.

BACKGROUND

As computing systems and communications devices become more powerful and complex, the interface between these systems and devices and the users continues to provide challenges to seamless human interaction and therefore poses difficult technical problems that have yet to be solved. For example, the conventional ability to depress a button on a keyboard to instruct a device to take an action, has largely been replaced by interaction with a touch screen display that provides little to no haptic or tactile information to the user as selections are made by a user. In an effort to provide some information to the user regarding the interaction with the touch screen display, some devices trigger a vibration in an effort to mimic or replace the feel of depressing a button. However, such vibration-based indications can be awkward and unnatural for the user and therefore can detrimentally affect user experience. Further, such vibration-based indications also prove less effective in implementations that may not involve interfacing with a user's fingers or hands. Such implementations may include those that are, for example, tailored for disabled users that require more discrete indications than a vibrating-approach can offer. As such, further innovation in the area of haptic or tactile outputs and feedback from computing systems and communications devices is needed.

BRIEF SUMMARY OF SOME EXAMPLES

According to some example embodiments, a tactile output apparatus is provided. The tactile output apparatus may comprise a dermal contact surface, a first securing member, and a second securing member. The tactile output apparatus may also comprise a first arm pivotally coupled to the first securing member and a second arm pivotally coupled to the second securing member. In this regard, the first arm may also be pivotally coupled to the second arm at an arm pivot point, and the dermal contact surface may move with the arm pivot point. Further, the first securing member may be movable along a first securing member travel path towards or away from the second securing member. Also, movement of the first securing member along the first securing member travel path may cause responsive movement of the arm pivot point and the dermal contact surface in a direction having a movement component perpendicular to the first securing member travel path.

According to some example embodiments, another tactile output apparatus is provided. The tactile output apparatus may comprise a dermal contact surface, a first securing member, and a second securing member. The tactile output apparatus may also comprise a first arm pivotally coupled to the first securing member and a second arm pivotally coupled to the second securing member. The first arm may also be pivotally coupled to the second arm at an arm pivot point, and the dermal contact surface may move with the arm pivot point. Further, the tactile output apparatus may comprise a first control cable operably coupled to the first securing member and a second control cable operably coupled to the second securing member. In this regard, actuation of the first control cable may move the first securing member along a first securing member travel path towards or away from the second securing member, and actuation of the second control cable may move the second securing member along a second securing member travel path towards or away from the first securing member. Additionally, actuation of the first control cable to move the first securing member along the first securing member travel path or actuation of the second control cable to move the second securing member along the second securing member travel path may cause responsive movement of the arm pivot point and the dermal contact surface in a direction having a movement component perpendicular to the first securing member travel path or the second securing member travel path.

Additionally, according to some example embodiments, an example method is provided. The example method may comprise actuating a first control cable operably coupled to a first securing member to move the first securing member towards a second securing member along a first securing member travel path, and actuating a second control cable operably coupled to a second securing member to move the second securing member towards the first securing member along a second securing member travel path. The example method may further comprise pivoting a first arm relative to the first securing member in response to moving the first securing member towards the second securing member. In this regard, the first arm may be pivotally coupled to the first securing member. The example method may further comprise pivoting a second arm relative to the second securing member in response to moving the second securing member towards the first securing member. In this regard, the second arm may be pivotally coupled to the second securing member and the second arm may be pivotally coupled to the first arm at an arm pivot point. Further, the example method may also comprise causing the arm pivot point and a dermal contact surface that moves with the arm pivot point to move in a direction having a movement component perpendicular to the first securing member travel path and the second securing member travel path, in response to the movement of the first securing member and the second securing member. Further, the example method may also comprise in response to the movement of the dermal contact surface, applying a tactile force on a dermal surface of a user via the dermal contact surface to provide tactile output to the user.

BRIEF DESCRIPTION OF THE SEVERAL VIEWS OF THE DRAWING(S)

Having thus described some embodiments in general terms, reference will now be made to the accompanying drawings, which are not necessarily drawn to scale, and wherein:

DETAILED DESCRIPTION

Figure 1:
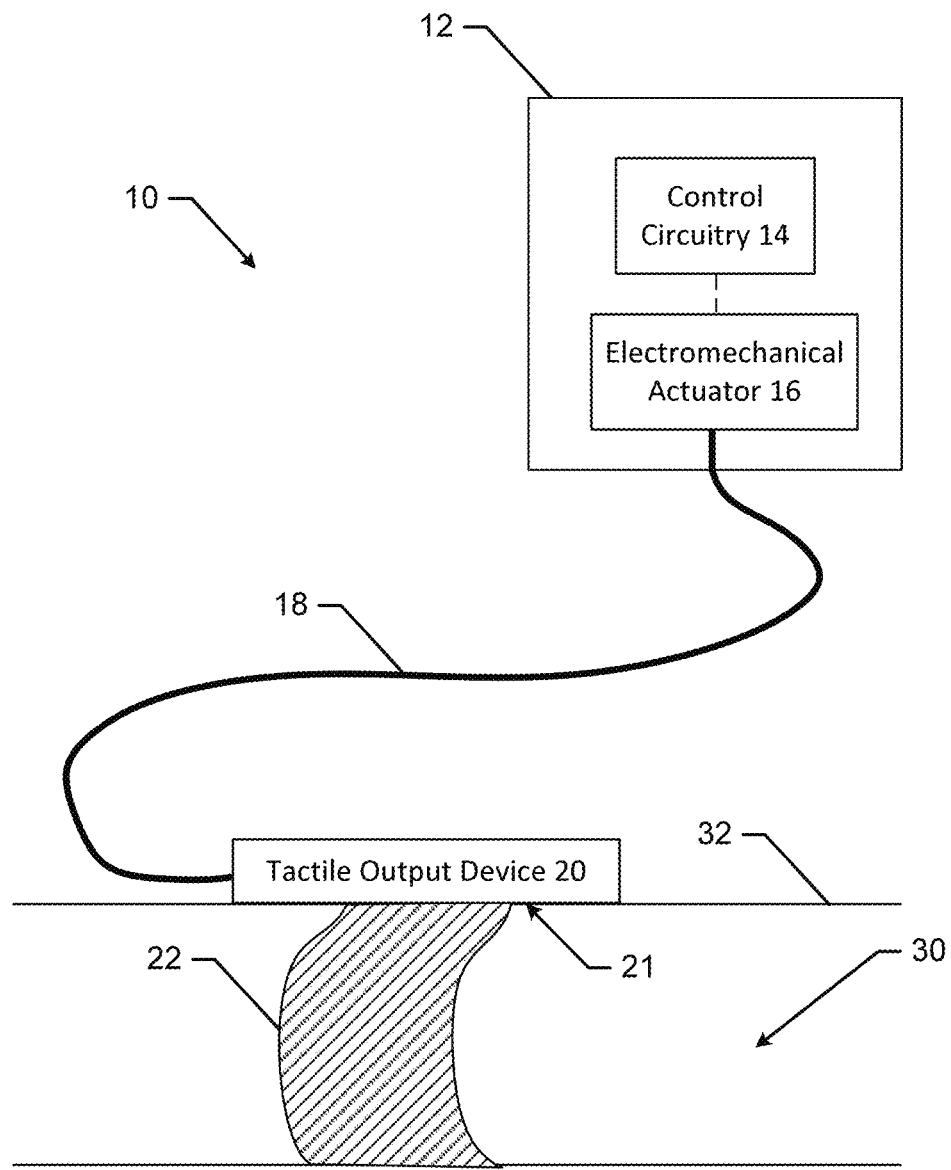
FIG. 1 is an illustration of a tactile output apparatus according to some example embodiments.

Some example embodiments will now be described more fully with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. The term "or" as used herein is defined as the logical or that is true if either or both are true.

Various example embodiments are provided herein that employ a moveable dermal contact surface that presses into a user's skin or dermal surface to provide a tactile or haptic output to the user. Such a dermal contact and applied pressure may be provided as an output of a user interface of an electronic device, such as a computing system or a communications device. The moveable dermal contact surface may be positioned on a user's skin in any number of locations on the user's body, which can prove to be particularly effective with paralyzed or otherwise disabled users. Some example positions may include soft and sensitive tissue locations such as the inner portion of the upper arm or forearm. Other example positions may include on or near a user's hand or foot (e.g., in a glove or footwear).

The dermal contact surface may be a component of a low-profile tactile output device that can be controlled, for example, directly or indirectly by control circuitry, to cause the dermal contact surface to extend out of a housing of the device to increase a contact depth and pressure applied to the skin of the user. According to some example embodiments, the low-profile nature of the device may be defined by the fully extended position of the dermal contact surface having a distance from a top surface of device's housing that is larger than a height of the housing (i.e., the dermal contact surface may extend out of the housing or a cavity in the housing further than the height of the housing or a depth of the cavity) as further described below. As a low-profile tactile device, according to some example embodiments, the device may be applied at positions, such as the inner upper arm of the user, without substantial discomfort due to the relatively small height of the device.

Additionally, a control mechanism and electronics that controls the tactile output device, according to some example embodiments, may be disposed remote from the device, for example, on an external or outer portion of the upper arm, or on a belt or backpack, or the like. In some example embodiments, the tactile output device may be mechanically controlled by a remote electromechanical actuator via, for example, control cables connected between the remote actuator (e.g., disposed on an outer portion of the arm) and the tactile output device (e.g., disposed on an inner portion of the arm). As such, by locating the control circuitry and the electromechanical actuators remote from the tactile output device, the size of the tactile output device may be minimized, thereby increasing the comfort of placing the device in places such as the inner portion of the arm. Alternatively, the tactile output device may be configured to move the dermal contact surface via an electromechanical actuator disposed proximate or within the housing of the tactile output device. However, the electronic control circuitry configured to send signals to control the electromechanical actuator may be located remote from the tactile output device but linked to the control circuitry via a wired or wireless communications connection.

Accordingly, FIG. 1 illustrates a block diagram of a tactile output apparatus 10 according to some example embodiments. In this regard, the tactile output apparatus 10 may be comprised of a control unit 12, control cables 18, and a tactile output device 20. The tactile output apparatus 10 may be a component of a user interface of an electronic device such as, for example, a computing system or a communications device.

The control unit 12 may be comprised of control circuitry 14 electrically connected to an electromechanical actuator 16. According to some example embodiments, the electrical connection may be wired or wireless. The control circuitry 14 may include a processor and a memory that may be configured to support various functionalities of tactile output apparatus 10 described herein, as well as, in some example embodiments, other functionalities of an electronic device that comprises the tactile output apparatus 10. The control circuitry 14 may also include other passive and active electronic components configured to support the operation of the control circuitry 14 as described herein. In some example embodiments, the processor of the control circuitry 14 may be configured to execute instructions stored in a memory to effectuate the functionality described herein. Alternatively, the processor may be hardware configured as, for example, an application specific integrated circuit (ASIC), a field programmable gate array (FPGA), or the like configured to execute the functionality of the control circuitry 14 as described herein.

The electromechanical actuator 16 may be any type of device configured to receive an electrical signal from the control circuitry 14 and, in response to the electrical signal, generate a physical or mechanical movement. For example, the electromechanical actuator 16 may be a servo, a motor, a solenoid actuator, or the like. In this regard, the physical movement may be utilized to ultimately cause movement of the dermal contact surface of the tactile output device 20. In this regard, the mechanical moving components of the electromechanical actuator 16 may be physically connected to a control cable 18. The control cable 18 may be a bundle of cables where each may be a co-axial cable that moves within an exterior sheath between a contracted position and an extended position. According to some example embodiments, the control cable 18 may include first cable and a second cable, where each cable operates to control a securing member and an arm of the tactile output device as further described below. In this regard, the electromechanical actuator 16 may be a single actuator that controls the movement of both the first and second cable, and the first and second cable may therefore move in unison by the same distance when actuation occurs. Alternately, the electromechanical actuator 16 may comprise two or more actuators that operate and are controlled independently of each other and are each physically connected to a respective control cable. In this regard, the control circuitry may control each of the separate actuators to move their respective cable independently such that, for example, the cables can but do not necessarily move in unison by the same amount (in opposite directions as described below). Such disparate movement may result in different types of movements of the dermal contact surface as further described below.

The tactile output device 20 may be applied adjacent to and onto the user's skin or dermal surface 32 and may include a moving element in the form of a dermal contact surface 21 that controllably extends into the skin 32 and away from the skin to provide a tactile output to the user. As shown in FIG. 1, the tactile output device 20 may, for example, be held in place by a strap 22 that may wrap around, for example, a user's arm 30. In this regard, the strap 22 may hold the tactile output device 20 in place such that movement of the dermal contact surface 21 applies a force onto the user's skin 32 that is highly detectable by the user. In this regard, the electromechanical actuator 16 may be configured to receive an electrical signal from the control circuitry 14, and in response to the electrical signal, actuate one or more control cables 18 to move a first securing member or a second securing member and ultimately cause dermal contact surface 21 to apply pressure on the skin or dermal surface of the user or relieve pressure on the skin or dermal surface of the user.

Figure 2:
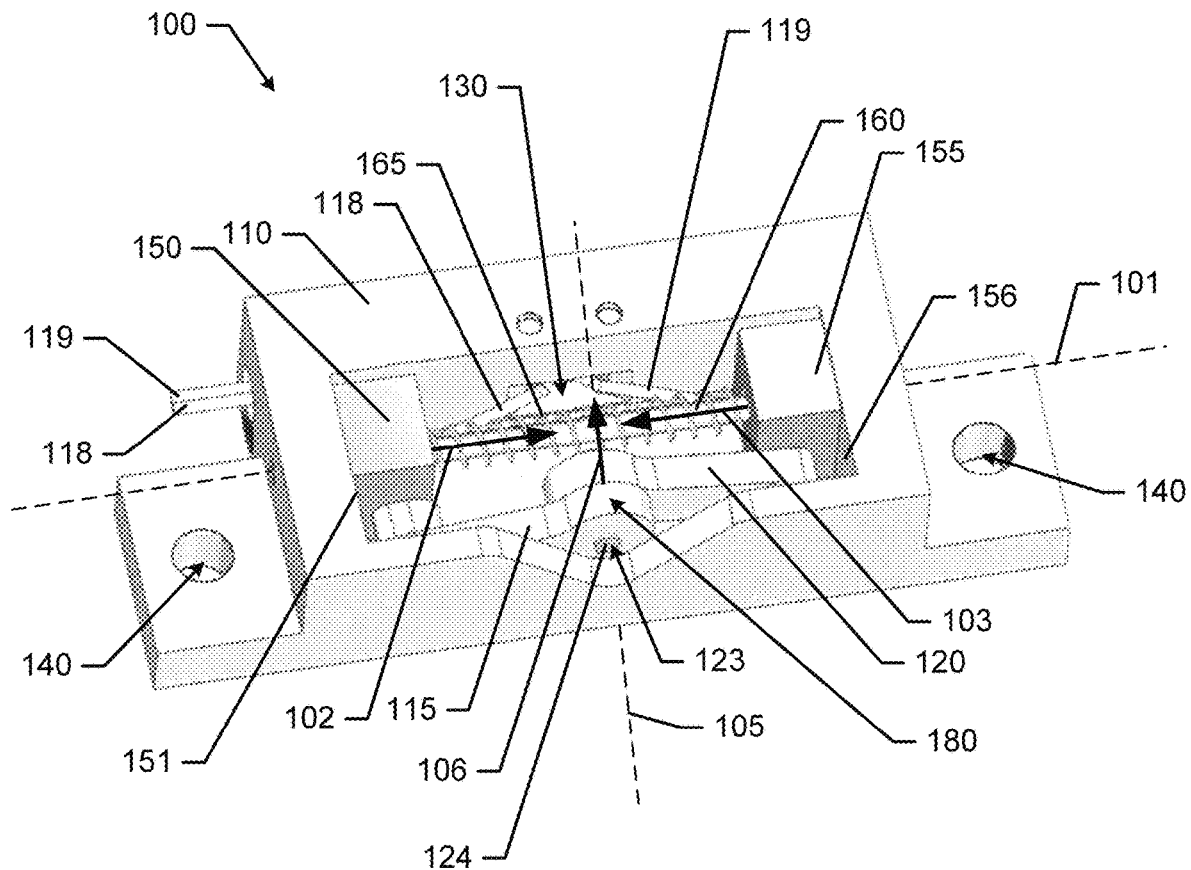
FIG. 2 is an illustration of a top perspective view of a tactile output device in a fully retracted position according to some example embodiments.
Figure 3:
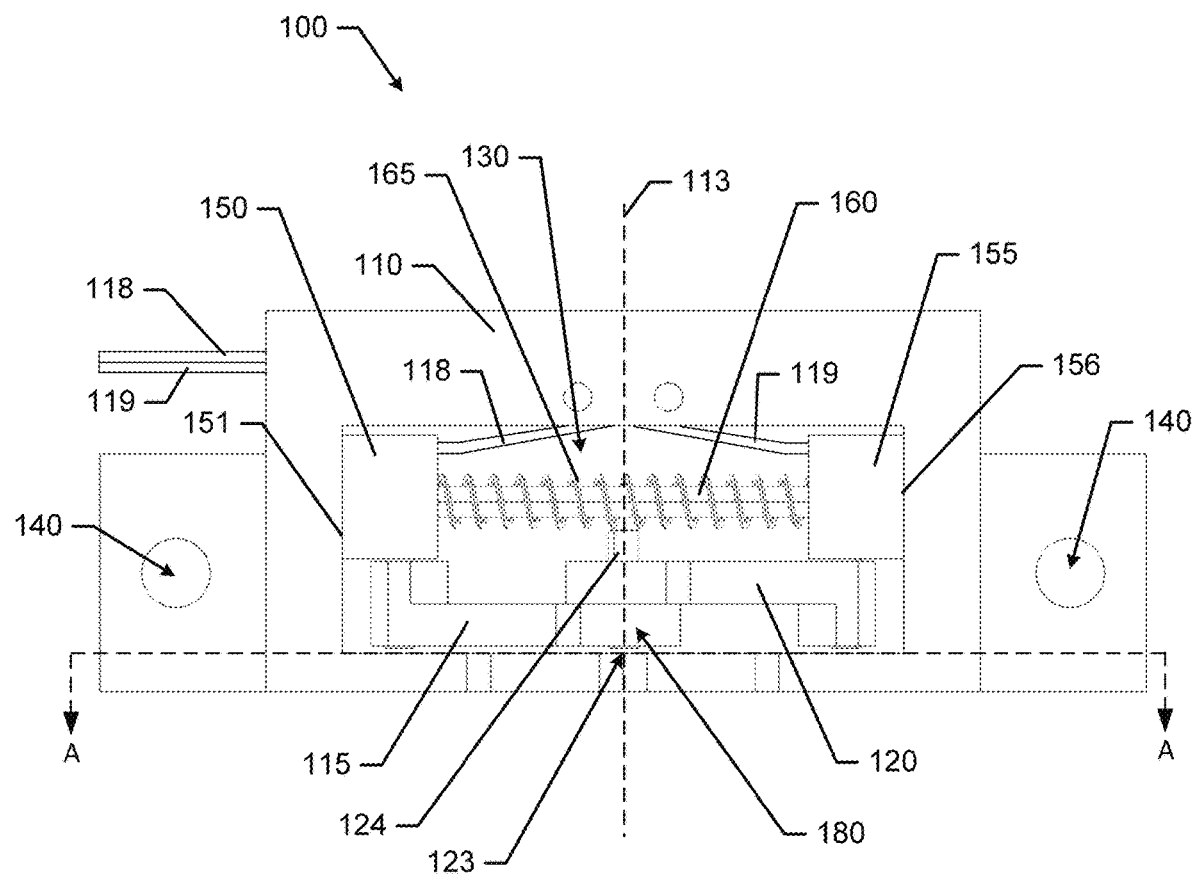
FIG. 3 is an illustration of a top view of a tactile output device in a fully retracted position according to some example embodiments.
Figure 4:
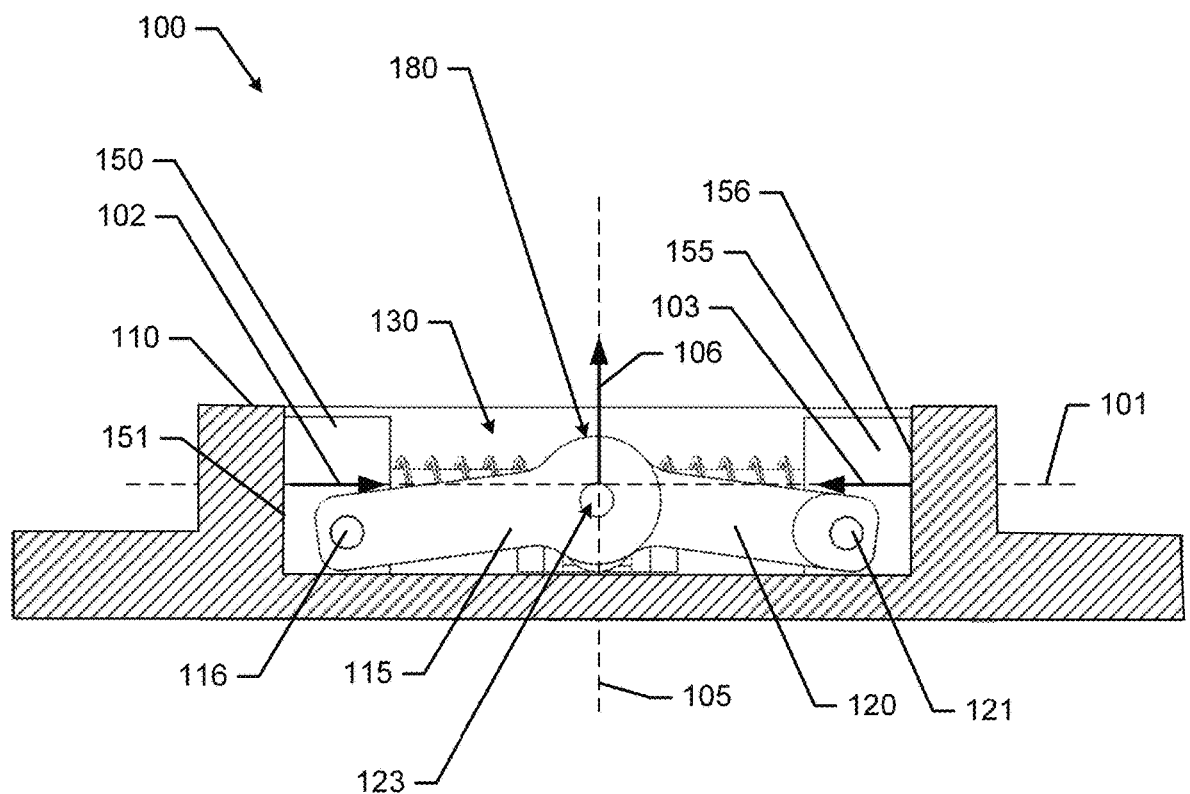
FIG. 4 is an illustration of a cross-section side view of a tactile output device in a fully retracted position according to some example embodiments.
Figure 5:
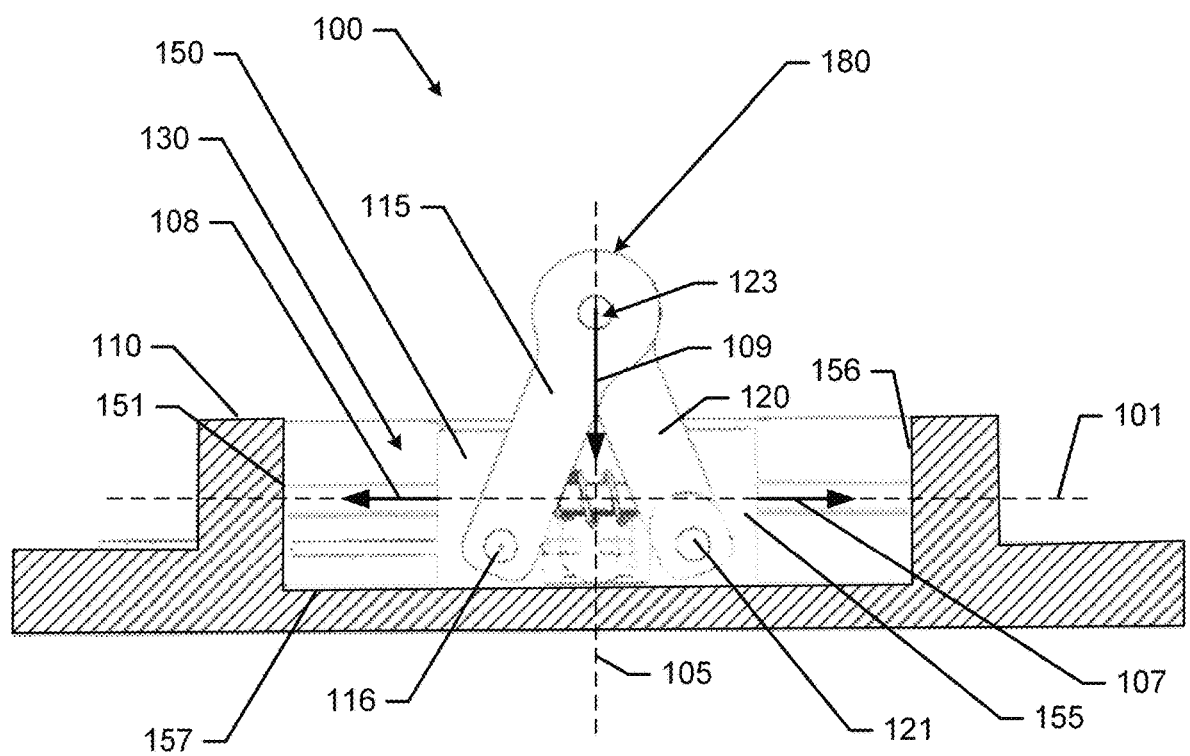
FIGS. 5 and 6 are illustrations of a cross-section side view of a tactile output device in a fully extended position according to some example embodiments.
Figure 6:
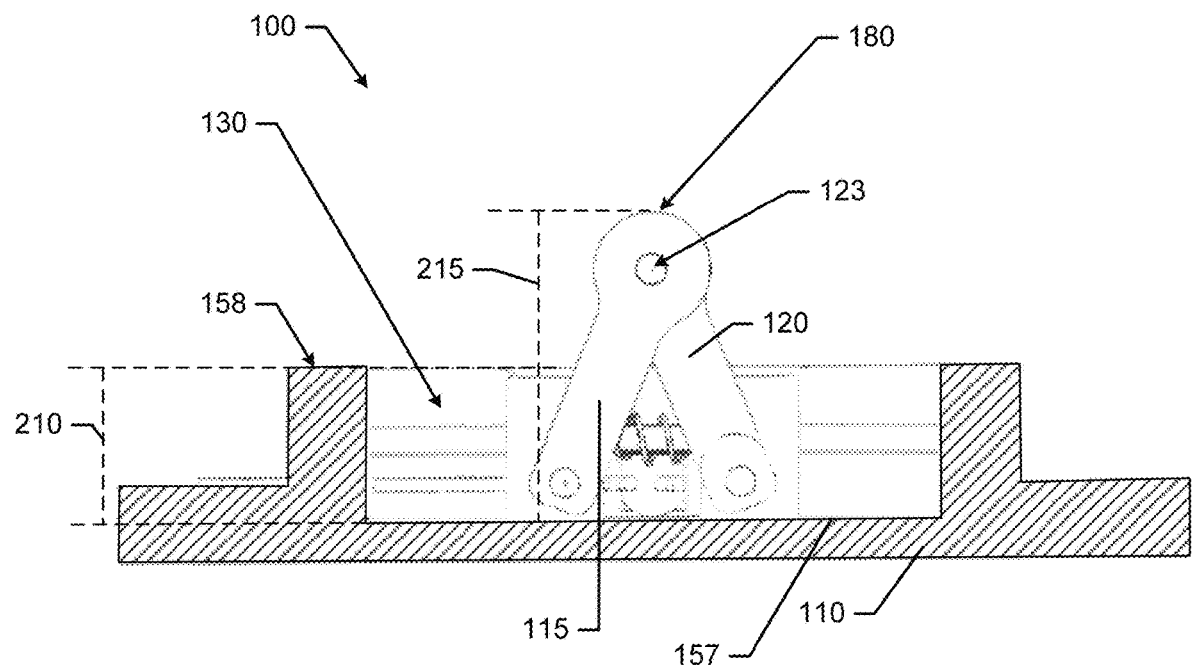

Having generally described the context and operation of the tactile output apparatus 10 and the tactile output device 20, FIGS. 2 through 6 will now be described which illustrate example embodiments of a tactile output device 100. In this regard, FIG. 2 illustrates a top perspective view of the tactile output device 100 which may be an example of the tactile output device 20. FIG. 3 illustrates a top view of the tactile output device 100 with an indication of a cross-section at A-A. In this regard, FIG. 4 shows a cross-section view of the tactile output device 100 at A-A with a dermal contact surface 180 in a fully retracted position. FIGS. 5 and 6 show a cross-section view of the tactile output device 100 at A-A with the dermal contact surface 180 in a fully extended position.

With respect to the structure of the tactile output device 100, the tactile output device 100 may comprise a housing 110 that receives first control cable 118 and second control cable 119 and includes a cavity 130. The mechanism for causing movement of the dermal contact surface 180 may be disposed within the cavity 130.

In this regard, the mechanism for causing movement of the dermal contact surface 180 comprises the first control cable 118, the second control cable 119, a first securing member 150, a second securing member 155, a first arm 115, and a second arm 120. According to some example embodiments, the mechanism may also include a rod 160 and a biasing member 165. As mentioned above, these components may be disposed in the cavity 130 formed in the housing 110.

In short and as described in further detail below, movement of the control cables 118 and 119 can cause movement of the securing members 150 and 155, along, for example, respective travel paths within the cavity 130. As the securing members 150 and 155 move towards each other, the arms 115 and 120, which are pivotally affixed to the securing members 150 and 155 respectively, rotate upwards (e.g., out of the cavity 130) due to the pivoting engagement between the arm 115 and 120 at an arm pivot point 123. Since the dermal contact surface 180 moves with the arm pivot point 123, the dermal contact surface 180 also moves upward and into increased contact with the skin of a user. In this regard, as provided in FIGS. 2 through 6, the dermal contact surface 180 may be disposed on the uppermost surface of the first arm 115 and the second arm 120. Additionally, as the securing member 150 and 155 move away from each other due to movement of the control cables 118 and 119, the arms 115 and 120 rotate downwards (e.g., into the cavity 130) and the dermal contact surface 180 decreases contact pressure with the skin of the user and retracts into the cavity 130.

According to some example embodiments, the housing 110 may be a rigid structure formed of, for example, a hard plastic or the like. According to some example embodiments, the rigid structure of the housing 110 may facilitate constrained movement of the components of the mechanism disposed in the cavity 130. The first control cable 118 and the second control cable 119 may enter the housing via a channel or passage that extends from an exterior of the housing 110 and into the cavity 130. According to some example embodiments, the housing 110 may include openings 140 that may be used with fasteners that pass through the openings to secure the housing 110 to a support base.

An end of the first control cable 118 extending into the cavity 130 may be physically connected to the first securing member 150. Similarly, an end of the second control cable 119 extending into the cavity 130 may be physically connected to the second securing member 155. Due to the physical connection between the control cables 118 and 119 with the securing members 150 and 155, respectively, movement of the control cables 118 and 119 (e.g., as provided by electromechanical actuator 16) may cause responsive movement of the securing members 150 and 155 within the cavity 130.

The securing members 150 and 155 may be formed in a number of shapes, such as in the form of blocks as shown in FIGS. 2 through 6. Further, the securing members 150 and 155 may be configured to be moveable in response to actuation of the control cables 118 and 119, and further translate that movement into movement of the first arm 115 and the second arm 120, which may be pivotally coupled to the first securing member 150 and the second securing member 155, respectively.

Movement of the securing members 150 and 155 within the cavity 130 may be constrained to a respective travel path. According to some example embodiments, the travel paths of the securing members 150 and 155 may be linear. For example, the travel paths of the first securing member 150 and the second securing member 155 may be constrained to move along an axis 101, which may be defined by a rod 160. The rod 160 may be affixed to the interior side walls of the cavity 130 and the rod 160 may pass through respective channels in the first securing member 150 and the second securing member 155 to restrict the movement of the first securing member 150 and the second securing member 155.

The movement of the first securing member 150 may therefore occur along a first securing member travel path that is defined along the axis 101 and the movement of the second securing member 155 may therefore occur along a second securing member travel path that is also defined along the axis 101. The first securing member travel path may be defined along the axis 101 between a position adjacent a first sidewall 151 of the cavity 130 (i.e., a first securing member retracted position) and a position adjacent to a central axis 113 of the cavity 130 (i.e., a first securing member extended position). The second securing member travel path may also be defined along the axis 101 between a position adjacent a second sidewall 156 of the cavity 130 (i.e., a second securing member retracted position) and a position adjacent to a central axis 113 of the cavity 130 (i.e., a second securing member extended position). In this regard, the second sidewall 156 may be disposed opposite the first sidewall 151 within the cavity 130 and the rod 160 may be affixed between these sidewalls 151 and 156. The central axis 113 of the cavity 130 may be defined, according to some example embodiments, as passing through a point that bisects the rod 160. The central axis 113 may also intersect with the axis 105, as further defined below.

As such, according to some example embodiments, movement or actuation of the first control cable 118 may cause the first securing member 150 to move along the axis 101 and the first securing member travel path towards or away from the second securing member 155. In this regard, the first securing member 150 may move between a first securing member retracted position and a first securing member extended position. As the first securing member 150 moves from the first securing member retracted position to a first securing member extended position, the first securing member moves toward the second securing member 155 along the axis 101. Further, as the first securing member 150 moves from a first securing member extended position to the first securing member retracted position, the first securing member moves away from the second securing member 155 along the axis 101.

Additionally, according to some example embodiments, movement of the second control cable 119 may cause the second securing member 155 to move along the axis 101 and the second securing member travel path towards or away from the first securing member 150. In this regard, the second securing member 155 may move between a second securing member retracted position and a second securing member extended position. As the second securing member 155 moves from the second securing member retracted position to a second securing member extended position, the second securing member moves toward the first securing member 150 along the axis 101. Further, as the second securing member 155 moves from the second securing member extended position to the second securing member retracted position, the second securing member moves away from the first securing member 150 along the axis 101.

Rather than the rod 160, other means for constraining the movement of the first securing member 150 and the second securing member 155 are contemplated. For example, in some example embodiments, the first securing member 150 and the second securing member 155 may include protrusions that travel within a guide slot in, for example, the rear wall or floor of the cavity 130 to constrain the movement of the securing member 150 and 155. Alternatively, a track rather than a guide slot may be used.

Additionally, according to some example embodiments, a biasing member 165 may be disposed between the first securing member 150 and the second securing member 155 to urge the securing members apart (or in some examples, together). As such, the biasing member 165 may urge the first securing member 150 toward the first securing member retracted position and the second securing member 155 toward the second securing member retracted position. As such, the movement force applied on the securing member 150 and 155 by the control cables 118 and 119 may be required to have a magnitude sufficient to overcome the force applied by the biasing member 165 to cause the securing member 150 and 155 to move towards each other. The biasing member 165 may be configured to urge the first securing member 150 and the second securing member 155 apart, and the arm pivot point 123 towards a fully retracted position, as further described herein.

According to some example embodiments, the biasing member 165 may be a spring disposed between the first securing member 150 and the second securing member 155. The spring may be a coil spring that is disposed on the rod 160, such that the spring spirals around the rod 160 and is in contact with the first securing member 150 and the second securing member 155. Alternatively, the biasing member 165 (or members) may be disposed in operable coupling with the control cables 118 and 119 to urge the control cables into a position that, in turn, would urge the securing members into respective positions. As another alternative, the biasing member 165 (or members) may be disposed between the sidewalls of the cavity 130 and the securing members 150 and 155 to, for example, pull the securing members 150 and 155 toward the sidewalls. Alternatively, according to some example embodiments, the arms 115 and 120 may be affixed to a torsion spring that urges the arms 115 and 120 apart, and thereby the securing members 150 and 155 into the retracted position. Additionally, one of skill in the art would appreciate that the urging force applied by the biasing member 165, in whatever form, may be reversed to cause the mechanism to default (e.g., when the control cables 118 and 119 apply no force) into an extended position rather than a retracted position.

As mentioned above, the arms 115 and 120 may be pivotally affixed to the securing members 150 and 155 and to each other such that movement of the securing members 150 and 155 results in movement of the arms 115 and 120. In this regard, the arms 115 and 120 may be elongated members that pivotally couple at an arm pivot point 123, for example, via a pin 124. In this regard, at the arm pivot point 123, according to some example embodiments, at least one of the arms 115 and 120 may have an opening through which a pin 124 passes. As such, the pin 124 may be able to rotate within the opening (or in some examples, the pin 124 may not rotate instead arm 115 and/or arm 120 may rotate around the pin 124) to permit the arms 115 and 120 to move in a hinged fashion relative to each other about the pin 124. According to some example embodiments, the arms 115 and 120 may be pivotally coupled to each other near respective ends of the arms 115 and 120, or, according to some example embodiments, the lengths of the arms 115 and 120 may extend past the arm pivot point 123 such that the arm pivot point 123 is disposed away from one or both ends of the arms 115 and 120.

In addition to being pivotally coupled to the second arm 120, the first arm 115 may also be pivotally coupled to the first securing member 150. In this regard, for example as shown in FIGS. 4 and 5, a pin 116 may pivotally couple the first arm 115 to the first securing member 150. Similarly, in addition to being pivotally coupled to the first arm 115, the second arm 120 may also be pivotally coupled to the second securing member 155. In this regard, for example, a pin 121 may pivotally couple the second arm 120 to the second securing member 155. As such, due to these couplings, movement of the securing members 150 and 155, as described above, between extended and retracted positions causes movement of the arms 115 and 120 between extended and retracted positions due to the relative rotational movement.

With respect to the movement of the components of the tactile output device 100, FIG. 4 shows the tactile output device 100 and its components in the fully retracted positions. In general, according to some example embodiments, the first arm 115 and second arm 120 may be configured to move such that as a distance between the first securing member 150 and the second securing member 155 decreases, the arm pivot point 123 moves away from a fully retracted position and towards a fully extended position. In this regard, the securing members 150 and 155 are adjacent to the sidewalls 151 and 156 and the arm pivot point 123 (as well as the dermal contact surface 180) are at their lower-most positions as shown in FIG. 4. As such, if the control cable 118 and 119 are actuated to move the securing members 150 and 155 towards each other (with the first securing member 150 moving in accordance with arrow 102 and the second securing member 155 moving in accordance with arrow 103), the arm pivot point 123 may move in a direction with at least a component of the movement in a direction perpendicular to the travel paths of the first securing member 150 and second securing member 155. This component of perpendicular movement of the arm pivot point 123 is indicated by arrow 106 along axis 105 which is perpendicular and skewed with respect to axis 101 and the travel paths of the securing members 150 and 155. Further, in a scenario where the control cable 118 and 119 are actuated to move the securing members 150 and 155 in unison at the same rate, the arm pivot point 123 may move only in the direction perpendicular to the axis 101, i.e., linearly. In this regard, actuation of the first control cable 118 to move the first securing member 150 along the first securing member travel path or actuation of the second control cable 119 to move the second securing member 155 along the second securing member travel path may cause responsive movement of the arm pivot point 123 and the dermal contact surface 180 in a direction only substantially perpendicular to the first securing member travel path or the second securing member travel path.

In this regard, FIG. 5 shows the tactile output device 100 in a fully extended position. In this regard, the first securing member 150 and the second securing member 155 have moved towards each other to inner-most positions relative to a center of the rod 160 (i.e., the first securing member fully extended position and the second securing member fully extended position). In this regard, the fully extended position of the of the arms 115 and 120 can occur when the first securing member 150 and second securing member 155 are a minimum distance away from each other. As such, the arm pivot point 123 and the dermal contact surface 180 are positioned at respective fully extended positions (e.g., maximum heights extending out of the cavity 130). When moving back towards the fully retracted position, the first securing member 150 may move in the direction of the arrow 108 along the axis 101 toward the sidewall 151, the second securing member 155 may move in the direction of the arrow 107 along the axis 101 toward the sidewall 156, and the arm pivot point 123 may move in the direction of the arrow 109 toward the floor 157 of the cavity 130.

Accordingly, actuation of the first control cable 118 to move the first securing member 150 along the first securing member travel path or actuation of the second control cable 119 to move the second securing member 155 along the second securing member travel path may cause responsive movement of the arm pivot point 123. Additionally, since the arm pivot point 123 and the dermal contact surface 180 move together or do not move relative to each other, the dermal contact surface 180 may move in a direction having a movement component perpendicular to the first securing member travel path or the second securing member travel path.

FIG. 6 illustrates relative measurements associated with the movement of the components of the tactile output device 100 relative to the fully retracted position and the fully extended position. In this regard, the cavity 130 defines a depth 210 that extends from the floor 157 of the cavity 130 to the top surface 158 of the housing 110. In the fully extended position (i.e., the arm pivot point 123 is in a fully extended position), as shown in FIG. 6, the dermal contact surface 180 extends above the top surface 158 of the housing 110 by a distance 215. According to some example embodiments, the tactile output device 100 is a low-profile device because the distance 215 is greater than the depth 210. In other words, the dermal contact surface 180 extends further out of the cavity 130 than the depth of the cavity 130 when the tactile output device 100 and its components are in the fully extended position. In this regard, one of skill in the art would appreciate that if longer arms 115 and 120 are used (e.g., requiring a wider but not deeper cavity 130), then the dermal contact surface 180 may extend even further out of the cavity 130 without increasing a height of the tactile output device 100.

Figure 7:
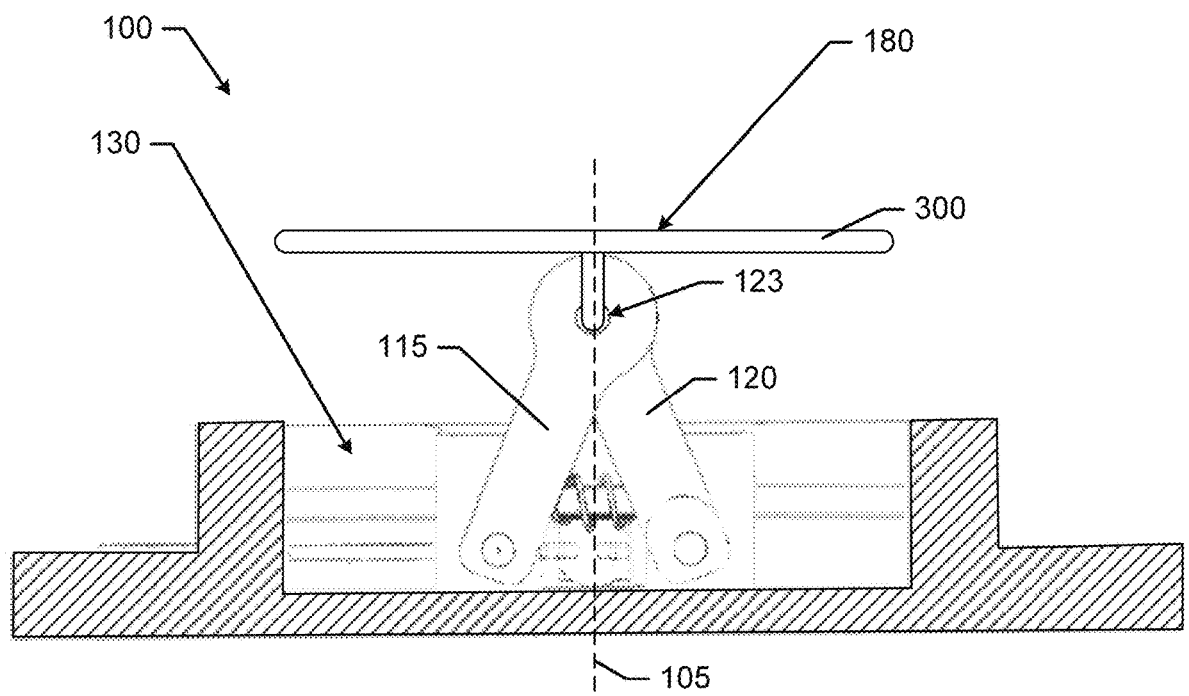
FIG. 7 is an illustration of a cross-section side view of a tactile output device with a dermal contact surface plate according to some example embodiments.
Figure 8:
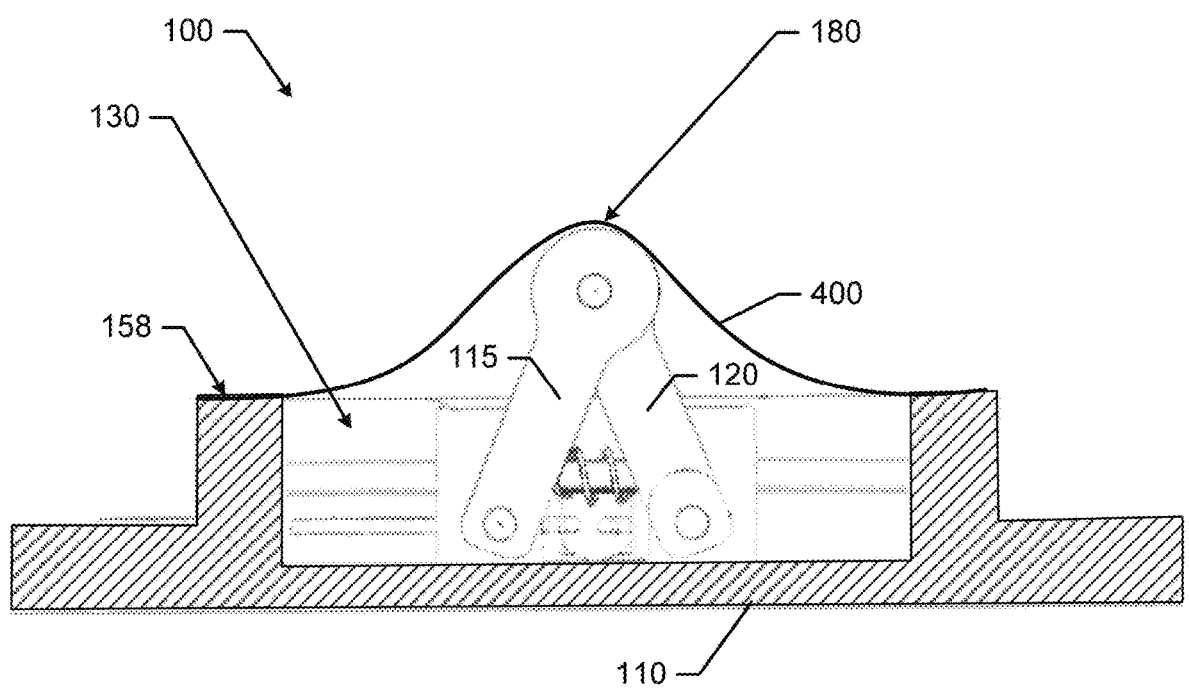
FIG. 8 is an illustration of a cross-section side view of a tactile output device with a dermal contact surface flexible member according to some example embodiments.

FIGS. 7 and 8 illustrate alternative dermal contact surfaces. In this regard, referring to FIG. 7, the dermal contact surface 180 may be on an external surface of a plate 300 that is affixed to one or both of the arms 115 or 120. In this regard, according to some example embodiments, the plate 300 may have a larger surface area relative to the edges of the arms 115 and 120, and therefore the engagement with the user's skin when the dermal contact surface 180 is disposed on the plate 300 may be increased and potentially more detectable by the user. According to some example embodiments, the area and shape of the plate 300 may be the same or similar to the area and shape of opening in the cavity 130. Further, according to some example embodiments, the plate 300 may be configured to maintain an orientation such that a plane of an external surface of the plate 300 (i.e., the dermal contact surface 180) may be substantially orthogonal to the movement of the arm pivot point 123 along the axis 105. Further, the external surface of the plate 300 (i.e., the dermal contact surface 180) may have a texture or protrusions (e.g., bumps) to increase contact surface area and indication of movement of the dermal contact surface 180 on the user's skin.

Alternatively, FIG. 8 shows an example embodiment of the tactile output device 100 with a flexible member 400 disposed over the opening in the cavity 130, and the dermal contact surface 180 may be disposed on a top surface of the flexible member 400. The first arm 115 or the second arm 120 may be disposed in contact with the flexible member 400 on an internal surface of the flexible member 400. In this regard, the flexible member 400 may be affixed to the top surface 158 of the housing 110 such that the opening in the cavity 130 is covered by the flexible member 400. In this regard, the flexible member 400 may be a pliable membrane made of, for example, latex, rubber, fabric, or the like. According to some example embodiments, the flexible member 400 may also apply a biasing force on the arms 115 and 120 that tends to urge the arms 115 and 120 towards the fully retracted positions.

Figure 9:
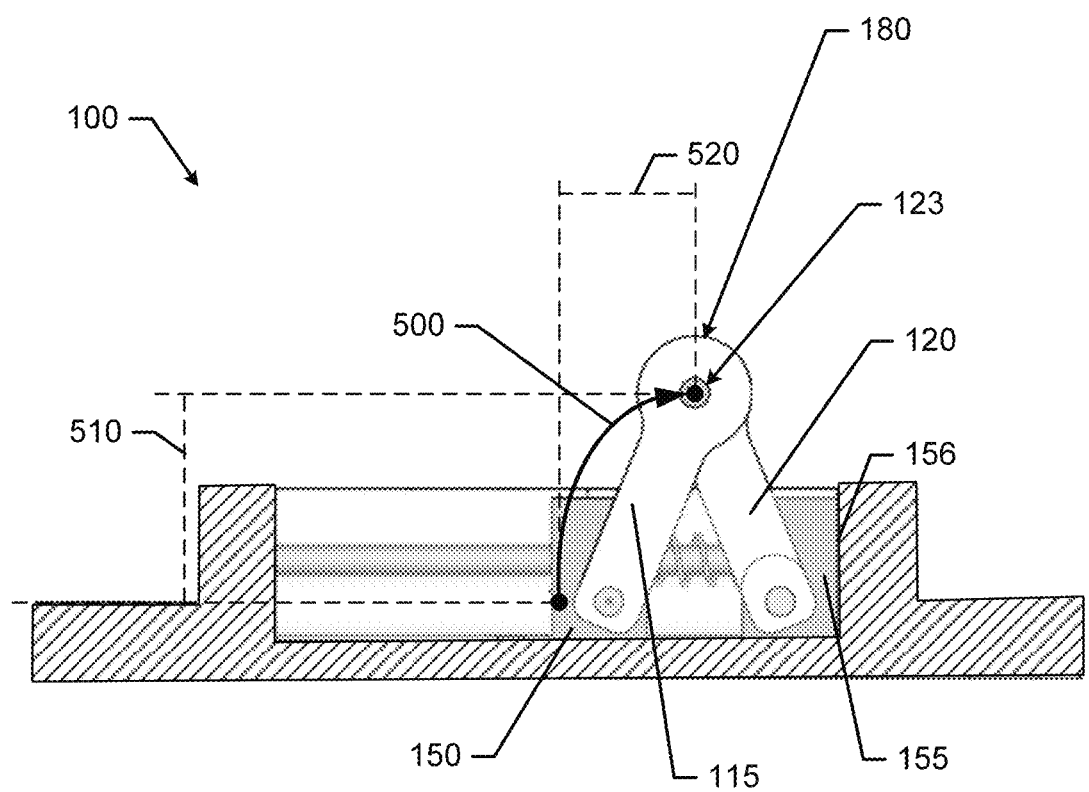
FIG. 9 is an illustration of a cross-section side view of a tactile output device in a fully extended position with the dermal contact surface offset from a center according to some example embodiments.

The example embodiments shown in FIGS. 2 through 8 show the securing members 150 and 155 displaced at equal distances from a center (e.g., central axis 113 of FIG. 3). However, as mentioned above, the control cables 118 and 119 may be separately and independently controlled and therefore the first securing member 150 and the second securing member 155 need not move in unison by the same distances, in opposite directions along the axis 101. As such, in scenarios where the securing members 150 and 155 move differently, the arm pivot point 123 and the dermal contact surface 180 may move partially in the perpendicular direction along axis 105, but also in a parallel direction based on the movement of one of the securing members. For example, as shown in FIG. 9, the first securing member 150 has moved toward the second securing member 155, while the second securing member 155 has remained stationary in a position adjacent the sidewall 156. The first securing member 150 may have moved into a fully extended position relative to the second securing member 155. In this regard, according to some example embodiments, the first securing member 150 and the second securing member 155 may be in a fully extended position when a distance between the first securing member 150 and the second securing member 155 is at a minimum.

Accordingly, the arm pivot point 123 moves in an arcuate manner along the path 500 by moving perpendicular or upwards by a distance 510 and also parallel or sideways by a distance 520. As such, the dermal contact surface 180 may undertake a sliding motion that is included in the upwards or perpendicular motion when applied to the skin of a user. Such a motion may be detectable as a different type of motion from a solely perpendicular motion to provide a different output to the user. In this regard, according to some example embodiments, the second securing member 155 may be permanently fixed in position and only the first securing member 150 may be moveable, thereby, according to some example embodiments, requiring only one control cable 118 to move the dermal contact surface 180. Accordingly, movement of only one of the securing members 150 or 155 may be needed, according to some example embodiments, to move the dermal contact surface 180 from the fully retracted position to a fully extended position.

Figure 10:
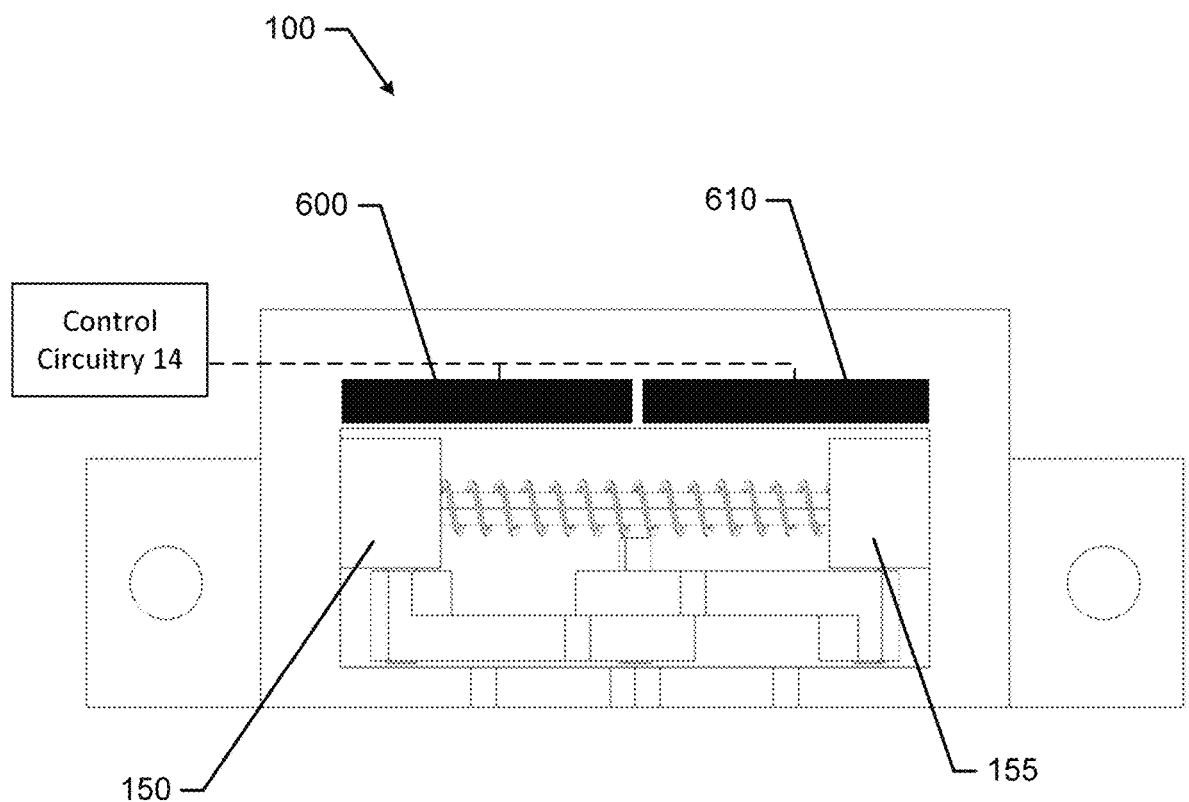
FIG. 10 is an illustration of a top view of a tactile output device in a fully retracted position including electromagnetic actuators according to some example embodiments.

FIG. 10 illustrates another example embodiment of the tactile output device 100 that include electromagnetic actuators 600 and 610 that are electrically controllable by the control circuitry 14 and electrical signals provided to the electromagnetic actuators 600 and 610 by the control circuitry 14. In this regard, using the electromagnetic actuators 600 and 610, the first securing member 150 and the second securing member 155 may be moved via controlled magnetic force without the need for mechanical control cables 118 and 119. In this regard, for example, the first securing member 150 and the second securing member 155 may include a ferrous material that can be attracted to a magnetic force generated by the electromagnetic actuators 600 and 610. Electromagnetic actuator 600 may be controlled to move first securing member 150 and electromagnetic actuator 610 may be controlled to move the second securing member 155. Via the electromagnetic actuators 600 and 610, the first securing member 150 and the second securing member 155 may move in the same manner as described above between fully retracted and fully extending positions.

Figure 11:
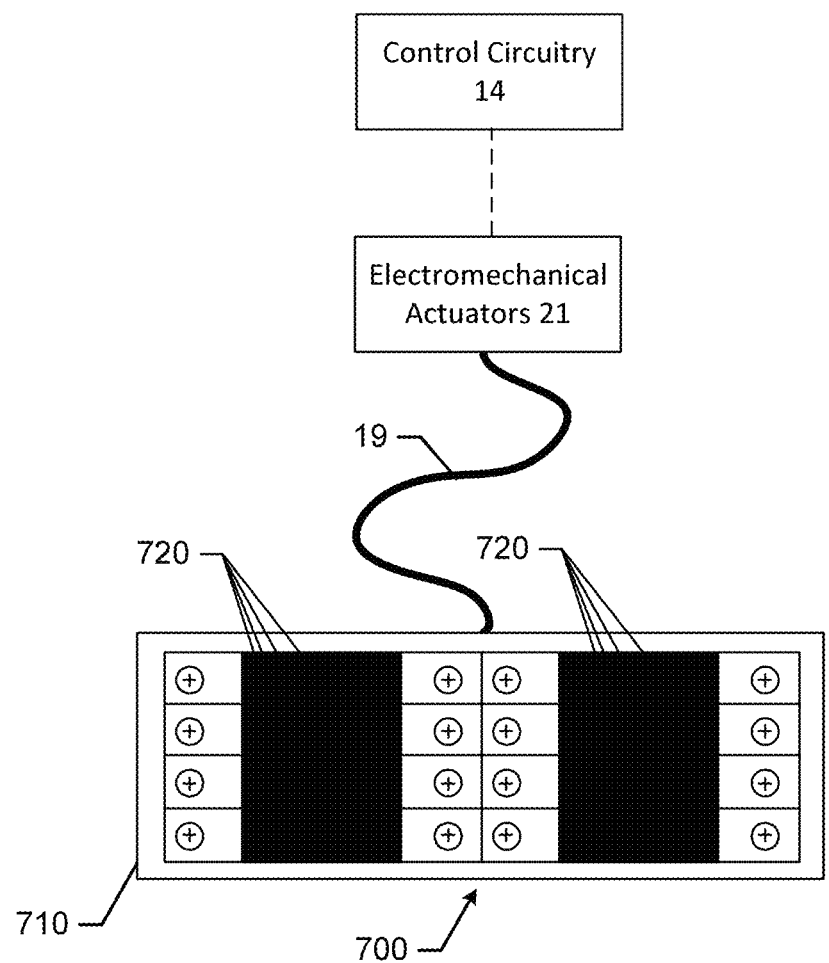
FIG. 11 is an illustration of a tactile output apparatus comprising an array of tactile output devices according to some example embodiments.

Referring now to FIG. 11, an example embodiment of a tactile output apparatus comprising an array 700 of tactile output devices is shown. In this regard, a plurality of tactile output devices 720 are shown affixed to a common substrate 710. Each of the tactile output devices 720 may be separately controlled to move their respective dermal contact surfaces. To do so, the control circuitry 14 may provide electrical signals to a plurality of electromechanical actuators 21. In this regard, an electromechanical actuator may be physically coupled to each control cable within in a control cable bundle 19 to control the individual tactile output devices 720 within the array 700. Via the array, a variety of different outputs may be provided to the user based on the various combinations and permutations of dermal contact surface movement amongst the tactile output devices 720.

Figure 12:
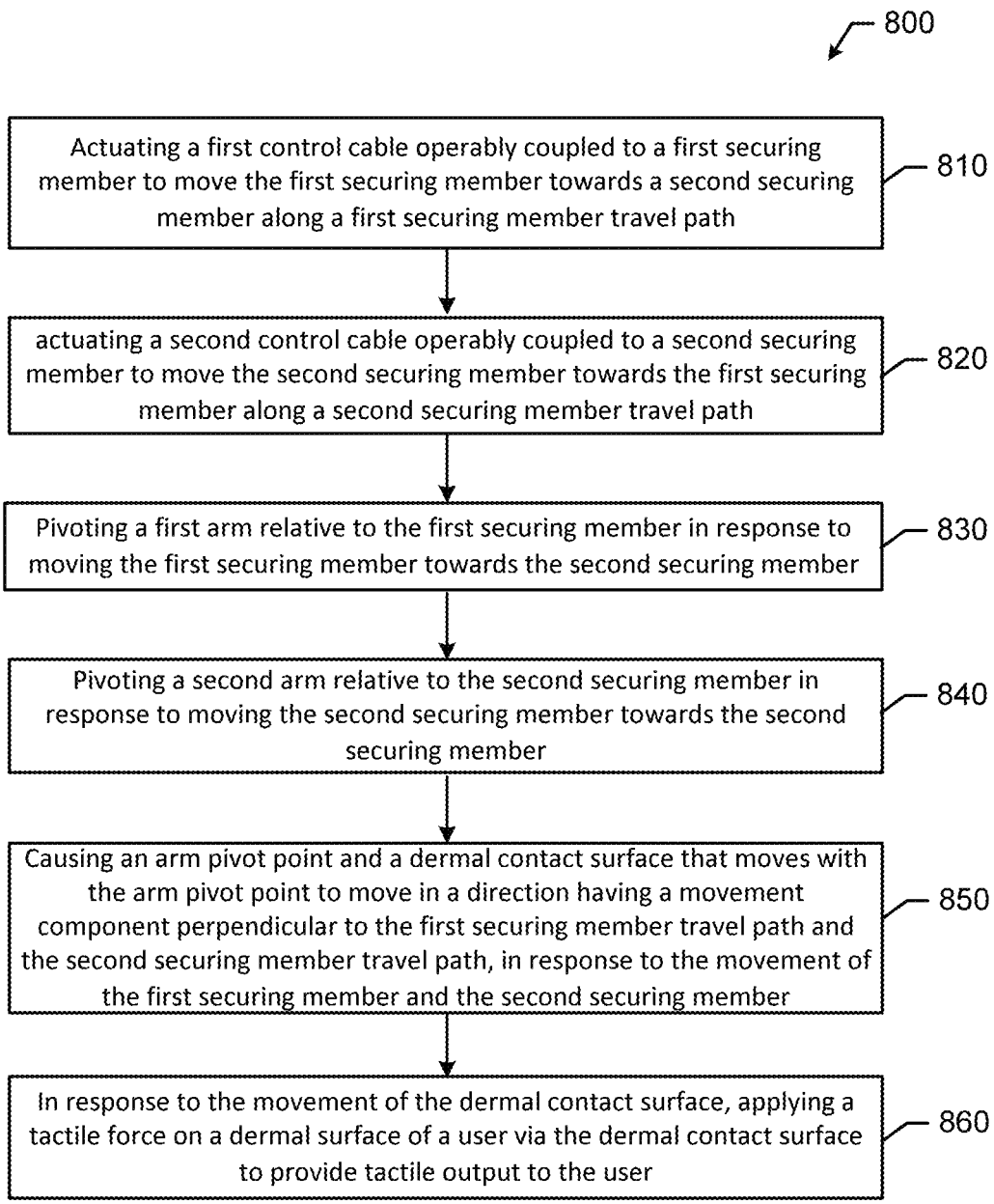
FIG. 12 is a flowchart of an example method of operating a tactile output device according to some example embodiments.

Now referring to FIG. 12, a flowchart of an example method 800 for operating a tactile output device according to some example embodiments is provided. In this regard, according to some example embodiments, at 810, the example method may comprise actuating a first control cable operably coupled to a first securing member to move the first securing member towards a second securing member along a first securing member travel path. The example method may further comprise, at 820, actuating a second control cable operably coupled to a second securing member to move the second securing member towards the first securing member along a second securing member travel path. Additionally, at 830, the example method may comprise pivoting a first arm relative to the first securing member in response to moving the first securing member towards the second securing member. In this regard, the first arm may be pivotally coupled to the first securing member. Further, at 840, the example method may comprise pivoting a second arm relative to the second securing member in response to moving the second securing member towards the first securing member. In this regard, the second arm may be pivotally coupled to the second securing member and the second arm may be pivotally coupled to the first arm at an arm pivot point. The example method may also comprise, at 850, causing the arm pivot point and a dermal contact surface that moves with the arm pivot point to move in a direction having a movement component perpendicular to the first securing member travel path and the second securing member travel path, in response to the movement of the first securing member and the second securing member. Additionally, at 860, the example method may comprise, in response to the movement of the dermal contact surface, applying a tactile force on a dermal surface of a user via the dermal contact surface to provide tactile output to the user.

Additionally, according to some example embodiments of the example method, the first securing member travel path and the second securing member travel path may be linear. Additionally or alternatively, actuating the first control cable to move the first securing member may comprise actuating the first control cable to move the first securing member against an urging force of a biasing member. Additionally or alternatively, according to some example embodiments, causing the arm pivot point and a dermal contact surface to move may comprise causing the arm pivot point to move to a fully extended position such that, with the arm pivot point in the fully extended position, a distance between the dermal contact surface and a top surface of a housing, is larger than a depth of a cavity of a housing. In this regard, the first securing member and the second securing member may be disposed within the cavity of the housing. Additionally or alternatively, the first securing member travel path and the second securing member travel path may be defined by a rod that passes through the first securing member and the second securing member.

In some embodiments of the example methods described above, additional optional operations may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments.

The embodiments presented herein are provided as examples and therefore the disclosure is not to be limited to the specific embodiments disclosed. Modifications and other embodiments are intended to be included within the scope of the appended claims. Moreover, although the foregoing descriptions and the associated drawings describe example embodiments in the context of certain example combinations of elements and/or functions, different combinations of elements and/or functions may be used to form alternative embodiments. In this regard, for example, different combinations of elements and/or functions other than those explicitly described above are also contemplated. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments.

That which is claimed:

1. A tactile output apparatus comprising:
    a housing;
    a dermal contact surface configured to move relative to the housing to provide a tactile output;
    a first securing member and a second securing member disposed within the housing;
    a first arm comprising a first arm distal end and a first arm proximal end, the first arm proximal end pivotally coupled to the first securing member at a first pivot;
    a second arm comprising a second arm distal end and a second arm proximal end, the second arm proximal end pivotally coupled to the second securing member at a second pivot, the first securing member and the second securing member configured to move linearly along an axis, the axis defined by the first securing member and the second securing member;
    a third pivot pivotally coupling the first arm distal end with the second arm distal end, the third pivot configured to move toward or away from the housing via a third pivot travel path that is perpendicular to the axis while the first arm proximal end moves parallel with the axis away or toward the second arm proximal end, wherein the dermal contact surface moves with the third pivot;
    a first control cable operably coupled to the first securing member; and
    a second control cable operably coupled to the second securing member;
    wherein actuation of the first control cable moves the first securing member along the axis towards or away from the second securing member;
    wherein actuation of the second control cable moves the second securing member along the axis towards or away from the first securing member; and
    wherein the first control cable and the second control cable are actuated to move the first securing member and the second securing member in unison at a same rate along the axis and actuation of the control cables causes responsive movement of the third pivot only linearly perpendicular to the axis.

2. The tactile output apparatus of claim 1 further comprising an electromechanical actuator operably coupled to the first control cable or the second control cable, the electromechanical actuator being configured to receive an electrical signal.

3. The tactile output apparatus of claim 1 wherein the first arm and second arm are configured to move such that as a distance between the first securing member and the second securing member decreases, the third pivot moves away from a fully retracted position and towards a fully extended position.

4. The tactile output apparatus of claim 1 wherein the housing comprises a cavity, the first securing member and the second securing member being disposed within the cavity; and
    a flexible member coupled to the housing and covering the cavity, the dermal contact surface being disposed on an external surface of the flexible member and the first arm or the second arm being disposed in contact with the flexible member on an internal surface of the flexible member.

5. The tactile output apparatus of claim 1 wherein the housing comprises a cavity, the first securing member and the second securing member being disposed within the cavity; and
    wherein when the third pivot is in a fully extended position, a distance between the dermal contact surface and a top surface of the housing is larger than a depth of the cavity.

6. The tactile output apparatus of claim 1 further comprising a rod that passes through the first securing member and the second securing member, wherein the first securing member and the second securing member travel along the axis using the rod.

7. The tactile output apparatus of claim 6 further comprising a biasing member disposed between the first securing member and the second securing member, the biasing member being configured to urge the first securing member and the second securing member apart and the third pivot towards a fully retracted position.

8. The tactile output apparatus of claim 1 further comprising a plate operably coupled to the first arm distal end or the second arm distal end, the dermal contact surface being disposed on an external surface of the plate, and the plate maintaining an orientation such that a plane of an external surface of the plate is substantially orthogonal to movement of the third pivot.

9. A tactile output apparatus comprising:
    a housing;
    a dermal contact surface configured to move relative to the housing to provide a tactile output;
    a first securing member and a second securing member disposed within the housing;
    a first arm comprising a first arm distal end and a first arm proximal end, the first arm proximal end pivotally coupled to the first securing member;
    a second arm comprising a second arm distal end and a second arm proximal end, the second arm proximal end pivotally coupled to the second securing member at a second pivot, the first securing member and the second securing member configured to move linearly along an axis, the axis defined by the first securing member and the second securing member; and
    a third pivot pivotally coupling the first arm distal end with the second arm distal end, the third pivot configured to move toward or away from the housing via a third pivot travel path that is perpendicular to the axis while the first arm proximal end moves parallel with the axis away or toward the second arm proximal end, wherein the dermal contact surface moves with the third pivot;

wherein the first securing member is movable along the axis towards or away from the second securing member and the first securing member and the second securing member move in unison at a same rate along the axis; and wherein movement of the first securing member along the axis causes responsive movement of the third pivot and the dermal contact surface relative to the housing in a direction having a movement component linearly perpendicular to the axis.

10. The tactile output apparatus of claim 9 further comprising an electromagnet configured to selectively generate a magnetic field to cause movement of the first securing member.

11. The tactile output apparatus of claim 9 further comprising a biasing member disposed between the first securing member and the second securing member, the biasing member being configured to urge the first securing member and the second securing member apart and the third pivot towards a fully retracted position.

12. The tactile output apparatus of claim 9 further comprising a first control cable operably coupled to the first securing member, wherein actuation of the first control cable moves the first securing member along the axis towards or away from the second securing member.

13. A method comprising:

actuating a control cable operably coupled to a first securing member to move the first securing member and a second securing member in unison at a same rate within a housing linearly towards each other along an axis, the axis defined by the first securing member and the second securing member;

pivoting a first arm relative to the first securing member in response to moving the first securing member towards the second securing member, the first arm being pivotally coupled to the first securing member at a proximal end of the first arm;

pivoting a second arm relative to the second securing member in response to moving the second securing member towards the first securing member, the second arm being pivotally coupled to the second securing member at a proximal end of the second arm and a distal end of the second arm being pivotally coupled to a distal end of the first arm at an arm pivot point;

moving the arm pivot point relative to the housing in a direction having a movement component perpendicular to the axis while the proximal end of the first arm moves parallel with the axis away or toward the proximal end of the second arm, in response to the movement of the first securing member and the second securing member, wherein movement of the arm pivot point causes movement of a dermal contact surface that moves with the arm pivot point; and in response to the movement of the dermal contact surface, applying a tactile force on a dermal surface of a user via the dermal contact surface to provide tactile output to the user.

14. The method of claim 13 wherein actuating the control cable to move the first securing member comprises actuating the control cable to move the first securing member against an urging force of a biasing member.

15. The method of claim 13 wherein causing the arm pivot point to move comprises causing the arm pivot point to move to a fully extended position, wherein, with the arm pivot point in the fully extended position, a distance between the dermal contact surface and a top surface of the housing is larger than a depth of a cavity of the housing, wherein the first securing member and the second securing member are disposed within the cavity of the housing.

16. The method of claim 13 wherein the axis is further defined by a rod that passes through the first securing member and the second securing member.

* * * * *